Oct. 3, 1944. V. A. TAUSCHER 2,359,495
HYDRAULIC POWER CONTROL VALVE
Filed Feb. 19, 1943
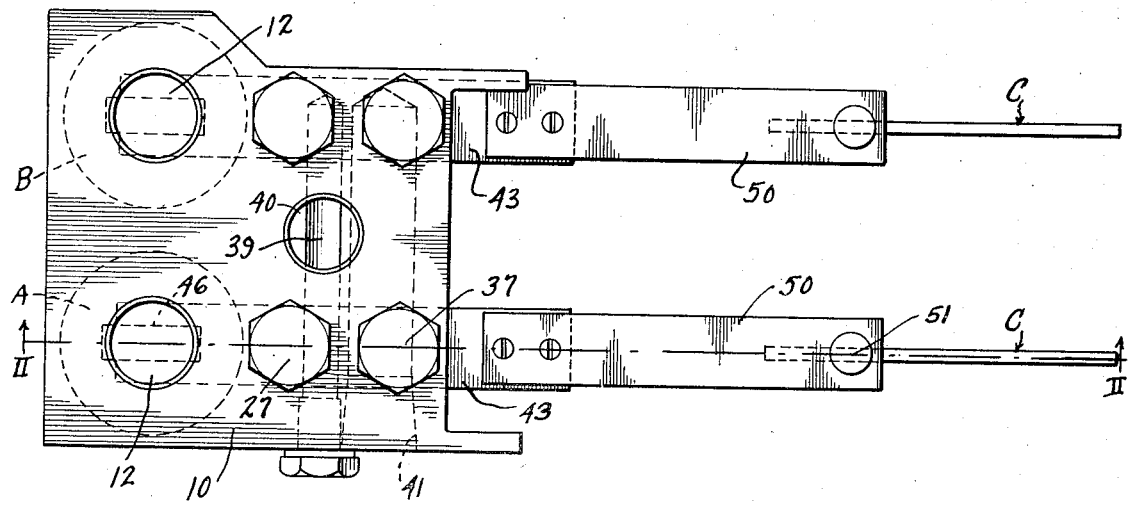
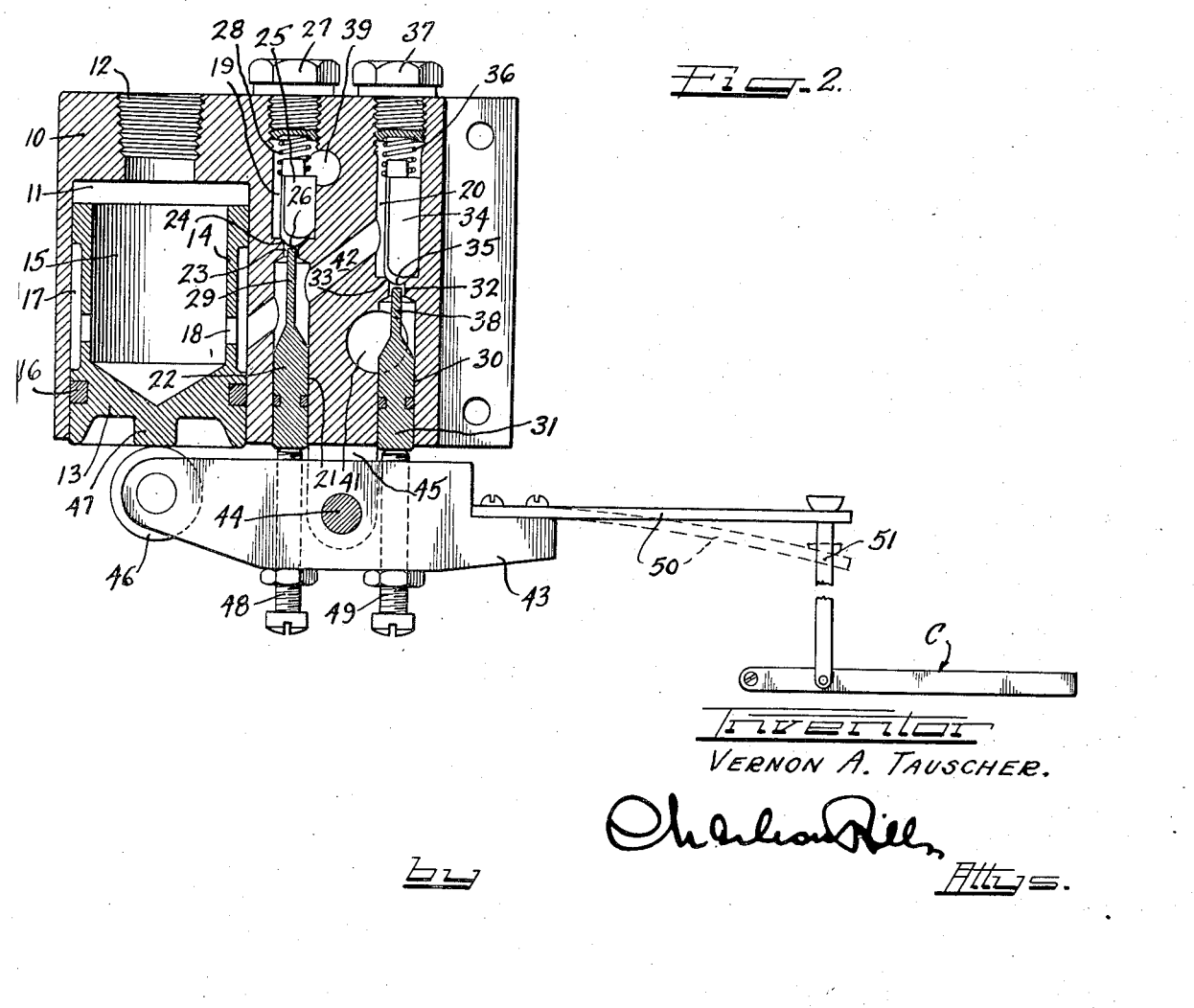
Inventor
VERNON A. TAUSCHER.

Patented Oct. 3, 1944

2,359,495

UNITED STATES PATENT OFFICE 2,359,495

HYDRAULIC POWER CONTROL VALVE

Vernon A. Tauscher, Inglewood, Calif.

Application February 19, 1943, Serial No. 476,399

8 Claims. (Cl. 303—54)

My invention relates to hydraulic power control valves and particularly to valves which are manipulated for the desired application of hydraulic fluid to structures to be controlled, as for example, the brakes of vehicles such as airplanes.

In controlling the brakes for the wheels of a landing gear of an airplane, it is very desirable that, when the pilot sets the brake control valves, either manually or by foot, he may feel through the hand or foot what braking pressure is being applied. In brake control valve structure for airplanes, a supply valve for controlling the pressure flow to the brakes and a return or release controlling valve is usually employed, the supply valve being controlled for desired pressure flow when the pilot sets the valve structure, and a pressure responsive element, such as a piston, is provided which is subjected to the pressure flow to the brakes so as to counteract the setting movement of the valve structure by the pilot whereby he may feel the pressure which is being delivered to the brakes for each setting of the valve structure.

The valve structures of the prior art for braking control in airplanes are more or less complicated and include valving and other elements which require expensive precision machining and finishing, and which are so located in the structure as to be inaccessible for adjustment purposes without more or less dismantling of the structure. Furthermore, in the prior art valve structures referred to, the load imposed by operation of the valving members reduces the pressure on the piston element so that the pilot, when setting the valve, does not get the full feel of the braking power delivered.

It is therefore an important object of my invention to provide a valve structure of simplified construction and arrangement which will eliminate precision machining and will permit ready adjustment of the various operating elements from the exterior of the structure.

Another object of the invention is to provide construction and arrangement in which the operation of the valve elements by movement of the piston element is through lever mechanisms having a mechanical advantage over the valve members so that the movement of the piston by the fluid pressure will give a true indication or feel to the pilot of the actual braking effort being applied.

Still a further object is to provide a valve structure which will assure smoothness of operation and flow of the fluid to the brakes without high pressure surges.

The above particularly referred to and other features of my invention are embodied in the structure shown on the drawing in which:

Figure 1 is a plan view of a valving assembly; and

Figure 2 is a section on plane II—II of Figure 1.

On the drawing Figure 1 shows an assembly of two valve units A and B as in braking on airplanes it may be desirable to independently and differentially brake the side wheels of the landing gear for steering of the airplane while on the ground. The construction and arrangement of each valve unit is shown by the sectional view Figure 2. The various valving members, ports and passageways and piston elements of the units are all within a common housing 10.

Referring to Figure 2, each unit has the cylinder space 11 with the outlet 12 from its upper end extending through the housing 10 for connection to suitable piping with the brakes for the corresponding wheels. Within the cylinder is the piston 13 having the upper extending skirt or flange 14 which with the piston defines the chamber 15. The piston and the upper end of the skirt 14 contact the cylinder wall, and a sealing ring 16 of suitable material is provided for the piston. The piston skirt has the circumferential recess providing the annular channel 17 between the skirt and the cylinder wall, and the skirt has ports or passages 18 connecting the annular channel with the chamber 15.

Adjacent to the cylinder space 11 the housing 10 has two bores extending downwardly therein to provide valve chambers 19 and 20, the axes of the bores being parallel with the axis of the piston structure. Extending upwardly through the housing 10 from the bottom thereof and in axial alignment with the valve chamber 19 is a guide bore 21 for a plunger 22. Connecting the valve chamber 19 and the upper end of the bore 21 is the valve port 23 at the upper end of which is the conical valve seat 24 for the valve 25. The valve may be in the form of a ball, or, as shown it may be in the form of a bar of triangular or other polygonal cross-section with a conical point 26 for engaging the seat 24. A closure plug 27 has threaded engagement in the upper end of the valve chamber bore and a spring 28 between this plug and the valve tends to hold the valve seated for closure of the port 23. The plunger 22 at its upper portion is of reduced diameter to form a pin end 29 which extends into the port 23 for engagement with the valve 25 to lift it off its seat when the plunger is raised.

Below the valve chamber bore 20 and in axial alignment therewith a bore 30 extends upwardly in the housing 10 for guiding a plunger 31. Between the valve chamber and the bore 30 is the port 32 at the upper end of which is the conical seat 33 for the valve 34 which, like the valve 25, may have a polygonal body terminating in the valve point 35 for engaging the seat 33. A spring 36 between the valve and the plug 37 tends to hold the valve to the seat. The plunger 31 has the pin end 38 extending through the port 32 for lifting the valve 34 off of its seat when the plunger 31 is raised.

Extending transversely through the housing 10 is a bore or passageway 39 communicating with the inlet opening 40 in the housing. This inlet 40 is connected with piping through which fluid under pressure is delivered from a source, such as a pump, or hydraulic accumulator, and the passageway 39 connects with the valve chambers 19 of the valve units A and B.

The housing 10 has another bore 41 therethrough which is in connection with the upper ends of the plunger bores 30 of the valve units A and B, the bore or passageway 41 being connected with the return line for flow of the hydraulic fluid back to the reservoir from which the hydraulic fluid is pumped. In each unit a cross passage 42 through the housing 10 connects the valve chamber 20 and the upper end of the plunger bore 21 with the channel 17 of the piston structure. The valve 25 controls the flow of pressure fluid to the brakes while the valve 34 controls the release or return flow from the brakes.

Below each valving unit is a setting lever 43, and for the levers a fulcrum shaft 44 is provided supported in bearing extensions 45 on the body 10, the fulcrum axis being midway between the axes of the plunger bores 21 and 30. The left end of each lever terminates below the corresponding piston 13 and is provided with a roller 46 engageable with the abutment boss 47 extending downwardly from the piston at the axis thereof. Threading through the lever at opposite sides of the lever fulcrum axis and in alignment with the plungers 22 and 31 respectively are abutment screws 48 and 49 for abutting the lower ends of the plungers.

The setting of each lever is controlled manually or by foot through a connecting train including an elastic member such as a spring. As shown on Figure 2 the elastic member is in the form of a spring bar 50 secured at its inner end to the right end of the lever and engaged at its outer end by a link 51 forming part of the connecting train to a hand or foot operated control C so that when braking is desired, operation of the control will cause downward movement of the link 51 for downward pressure on the end of the spring bar.

When the brake is released and relieved of all pressure, the valve structure parts will be in the normal or neutral position shown on Figure 2. The roller 46 will be in engagement with the boss 47 on the piston, and the adjustment of the screws 48 and 49 is such that the pin end of the plunger 22 will be close to but clear of the valve 25 for closure of this valve by the pressure in the valve chamber from the pressure passageway 39, while the pin end of the plunger 31 will be close to but clear of the release valve 34 for closure by the valve of the release port 32. When it is desired to brake, the pilot operates the control C for downward pull on the spring bar and deflection and loading thereof, as shown by the dotted line in Figure 2. Practically at the instant that the setting lever is started to be rotated in clockwise direction, the roller 46 will move the piston upwardly and the abutment 48 will shift the plunger 22 upwardly for opening of the inlet valve 25 so that, during the very short preliminary clockwise rotation of the setting lever from its normal position fluid under pressure will flow through the open port 23, the cross passage 42, the piston channel 17 and ports 18 into the piston chamber 15 and the cylinder space 11 and from there through the outlet 12 to the brake. Thus, after the setting lever has barely been started to rotate by operation of the control by the pilot, the pressure built up against the piston will cause outward movement thereof against the lever so that the flexing or loading of the spring 50 will be counteracted by the piston under the pressure in the cylinder 11 and at the brakes, and the pilot, either through the hand or foot, will feel this pressure and can determine therefrom what braking pressure is being applied at the brakes. If the manual setting and loading of the spring 50 is maintained by the pilot, the piston pressure will overcome the spring loading and restore the setting lever to its normal position in which position both plungers will be set for closure of both valves, and the brake will be hydraulically held at the set pressure.

Should the pilot now desire to increase the braking effort, he will operate the control for corresponding increased deflection or loading of the spring 50, which loading will momentarily overcome the piston pressure so that the setting lever 43 is rocked clockwise sufficiently for reopening of the valve 25 by the plunger 22, and as more fluid now flows into the cylinder 11, the piston will counteract and equal the spring load for return of the setting lever to normal and closure of the inlet valve and holding of the increased brake pressure so long as the loading of the spring 50 is maintained.

Should the pilot desire to ease up or reduce the braking power, he will operate the control to relieve the deflection or load on the spring 50. Immediately upon such reduction of the spring load, the pressure in the cylinder 11 against the piston will predominate and rock the setting lever 43 in counterclockwise direction from its normal position to release the abutment 48 from the plunger 22 for closure of the inlet valve 25 and for raising of the plunger 31 by the abutment 49 for unseating of the release valve 34. Fluid will then be discharged from the brake line through the cross passage 42 into the release valve chamber 20 and through the port 32 and out through the return passageway 41, and such release flow continues until the brake line pressure against the piston has been reduced sufficiently to permit the spring 50 to restore the setting lever to its normal position for closure of both valves and holding of the brake at the reduced pressure. For all the various settings of the control by the pilot, he can feel the pressure of the piston against the setting lever and so determine what braking effort is being applied by the brake.

It will be noted that the abutments 48 and 49 on the setting lever for the valve actuating plungers are close to the fulcrum axis of the lever, and the axis of the roller 46 is comparatively distant from the lever fulcrum axis. Thus, when the setting lever is rocked by the piston against the resistance of the loading spring 50, comparatively negligible power effort is required to shift the plungers and valves so that the actual brake pressure at any time is communicated by the piston through the setting lever and loading spring for feel by the pilot who will then always accurately know just what braking effort is being applied.

The pilot may operate the control for gradual or sudden opening of the inlet valve. Upon slow opening movement of the inlet valve the pressure will be gradually built up at the brake in a smooth manner. If the inlet valve is suddenly fully opened for rapid inflow of fluid under pressure, the cylinder space 11 and piston space 15 will act as a surge chamber to quiet the flow before reaching the brake, and setting up of high pressure surges in the brake will be prevented. The provision of the surge space will also be effective, upon sudden wide opening of the inlet valve, to prevent over movement of the piston and overthrow or back swing of the setting lever with consequent sudden opening of the release valve 34.

The valve controls C may be arranged for operation by the pilot for independent or simultaneous braking of the respective wheels, or for differential braking for steering of the airplanes on the ground.

It is apparent that the lever 43 could be directly operated by a control C without intervention of the spring arm 50 or other spring means. It is also apparent that the control, when in idle position, could hold the lever 43 for opening of the release valve so that the last amount of fluid may escape from the brakes without resistance. Then, upon operation of the control for braking, the lever will be rocked back through normal position for closure of the release valve before opening of the supply valve.

It will be noted that in my improved valve structure the abutments 48 and 49 for the plungers which control the operation of the valves are accessible from the exterior of the structure for adjustment, this being a decided advantage over prior art valve structures in which adjusting means are on the inside and require more or less dismantling for access thereto.

I have thus produced a simplified hydraulic brake control valve structure in which a feel piston has mechanical advantages over the flow control valves, which valves can be externally adjusted to insure accurate and efficient operation of the valve structure. I do not, however, desire to be limited to the exact structure or arrangement shown and described as modifications are possible which would still come within the scope of my invention.

I claim as follows:

1. A hydraulic brake valve structure comprising a body, a supply valve element in said body, a release valve element in said body, a cylinder space in said body having an outlet for connection with a brake to be controlled, a setting lever having abutments thereon for engagement with said valve elements, said lever being normally in position for closure of both valve elements, control means, a spring between said control means and said lever adapted upon operation of said control means to be loaded for swing of said lever for opening of the supply valve element for flow of fluid under pressure into said cylinder, and a piston in said cylinder engaging said lever and subjected to the braking pressure in said cylinder to counteract said loaded spring for swing of said lever back to normal position and closure of said supply valve element, said abutments on said lever being adjustable from the exterior of the valve body.

2. A hydraulic brake valve structure comprising a body, a cylinder space in said body having an outlet for fluid flow to the brake, a fluid supply valve in said body for controlling the flow of fluid to said cylinder space, a release valve in said body for controlling the return of fluid from said brake and cylinder space, said valves being arranged at one side of said cylinder space, plungers for operating said valves, the axes of said plungers and cylinder space being in a common plane, a setting lever adjacent to the ends of said plungers and fulcrumed on said body with its fulcrum axis between the axes of said plungers, a control, a spring connecting said control with one end of said lever to be loaded by operation of said control for rocking of said lever for opening of the supply valve for flow of fluid into said cylinder and to the brake, and a piston within said cylinder space engaging the other end of said lever and subjected to the pressure in said cylinder space to counteract the loading of said spring for return of said setting lever for closure of said supply valve as soon as the pressure has overcome the spring load.

3. A hydraulic brake valve structure comprising a body having a cylinder space therein provided with an outlet for flow of fluid under pressure to a brake to be controlled, a supply valve in said body for controlling the flow of fluid under pressure from a supply source into said cylinder space, a release valve in said body for return flow of fluid from the brake and cylinder, actuating plungers for said valve elements extending to the exterior of said body, a setting lever fulcrumed on said body close to the ends of said plungers and on an axis between the axes of said plungers, adjustable abutments on said setting lever engaging said plungers, a loading spring connecting with said setting lever, a control operable manually or by foot for loading said spring for rocking of said setting lever in direction to open said supply valve for flow of fluid through said cylinder space and to the brake, a piston movable in said cylinder space by the pressure flow and engageable with said setting lever for counteracting the loading of said spring for return of said setting lever for closure of said supply valve element, the pressure of said piston rocking said lever for opening of said release valve element when the loading of said spring is reduced.

4. A hydraulic brake valve structure comprising a body having a cylinder space therein provided with an outlet for flow of fluid under pressure to a brake, a supply valve for controlling the flow of fluid under pressure into said cylinder space, a release valve for controlling the return flow of fluid from said cylinder space, actuating elements for said valves exposed to the exterior of said body, a setting lever extending adjacent to said actuating elements and having abutments thereon engaging said elements, said lever being fulcrumed on said body with the fulcrum axis close to said abutments, a loading spring engaging said lever, manual control means for loading said spring for rocking of said lever for actuation of elements for opening of said supply valve for flow of pressure fluid into said cylinder and to the brake, and a piston in said cylinder subjected to the pressure therein for engagement with said setting lever to counteract the spring loading on said lever and to return said lever for closure of said supply valve whereby the brake will then be held by the pressure determined by the loading of said spring.

5. A hydraulic brake valve structure comprising a body having a cylinder space therein with an outlet for flow of fluid under pressure to a brake to be controlled, a supply valve assembly in said body for controlling the flow of fluid under pressure into said cylinder space, a release valve assembly in said body for controlling the release of fluid from said cylinder space, said valve assemblies being exposed at one end to the exterior of said housing, a setting lever fulcrumed on said body and having adjustable abutments thereon engaging the exposed ends of said valve assemblies, the fulcrum axis of said lever being between said abutments and close thereto, said valve assemblies being closed when said lever is in a normal position, a loading spring adjustable to exert a predetermined load on said lever tending to rock it in one direction from its normal position for opening of the supply valve assembly by the corresponding abutment, and a piston within said cylinder space subjected to the pressure therein for engaging said lever for rocking said lever against the spring load back to normal position for closure of said supply valve assembly and for opening of said release valve assembly by the corresponding abutment upon release of the spring loading from the lever.

6. A hydraulic brake valve structure comprising a body having a cylinder space therein with an outlet for flow of fluid under pressure to a brake to be controlled, a piston movable in said cylinder space, a supply valve assembly in said body for controlling the pressure flow into said cylinder space and to the brake to be controlled, a release valve assembly in said body for controlling the release flow from said cylinder space and brake, said piston and said valve assemblies being movable in a common plane, a setting lever fulcrumed on said body and having adjustable abutments thereon for engagement with said valve assemblies and having an abutment thereon for engagement by said piston, said valve assemblies being closed when said lever is in a normal position, a loading spring connecting with said lever and adjustable for loading said lever for rocking thereof away from its normal position for opening of said supply valve assembly by the corresponding abutment whereby fluid under pressure will flow into said cylinder space and to the brake, said piston being subject to said pressure flow for counteracting the spring loading for restoring of said lever to normal position for closure of said supply valve assembly, said lever fulcrum being close to said valve assembly engaging abutments and said abutment for the piston being at a greater distance from said fulcrum whereby the piston movement will have a mechanical advantage over the valve assembly movement and the power absorbed by the valve assembly movement will be reduced to a minimum.

7. A hydraulic brake valve structure comprising a body having a cylinder space therein provided with an outlet for flow of fluid under pressure to a brake to be controlled, a supply valve in said body for controlling the flow of fluid under pressure from a supply source into said cylinder space, a release valve in said body for return flow of fluid from the brake and cylinder, actuating plungers for said valve elements extending to the exterior of said body, a setting lever fulcrumed on said body close to the ends of said plungers and on an axis between the axes of said plungers, adjustable abutments on said setting lever for engaging said plungers, a control for operating said lever for opening and closing of said valve, a pressure responsive element in said cylinder space having direct connection with said lever and subjected to the pressure of said cylinder space when said lever is operated to open said supply valve and close said release valve whereby said pressure responsive element will move said lever in reverse direction until the brake pressure equals the operating pressure on said lever for opening of the supply valve.

8. A hydraulic brake structure comprising a body having a cylinder space therein provided with an outlet for flow of fluid under pressure to a brake to be controlled, a supply valve assembly in said body for controlling the flow of fluid under pressure from a supply source into said cylinder space, a release valve assembly in said body for return flow of fluid from the brake and cylinder, a setting lever fulcrumed on said body on an axis close to and between the axes of said valve assemblies, adjustable abutments on said lever for actuating said valve assemblies and set to be separated from said valve assemblies by a slight gap when said lever is in normal position whereby only a slight rotation movement of said lever will effect opening or closing of the corresponding valve assemblies, means for loading said lever under a pressure proportionate to the desired braking pressure for closure of the release valve assembly and opening of the supply valve assembly, a pressure responsive element in said cylinder space having connection with said lever and subjected to the fluid pressure in said cylinder space to counteract the loading pressure of said lever to move said lever back to normal position when the braking pressure has overcome the lever loading pressure and to move said lever from its normal position for closing of said supply valve assembly and opening of said release valve assembly when the loading pressure on said lever is decreased.

VERNON A. TAUSCHER.